(12) United States Patent
Black

(10) Patent No.: US 9,354,909 B2
(45) Date of Patent: May 31, 2016

(54) PROCESSING SYSTEMS AND METHODS

(71) Applicant: Alistair Black, Los Gatos, CA (US)

(72) Inventor: Alistair Black, Los Gatos, CA (US)

(73) Assignee: VM-ROBOT, INC., San Jose, CA (US)

( * ) Notice: Subject to any disclaimer, the term of this patent is extended or adjusted under 35 U.S.C. 154(b) by 156 days.

(21) Appl. No.: 14/067,775

(22) Filed: Oct. 30, 2013

(65) Prior Publication Data
US 2015/0121367 A1 Apr. 30, 2015

(51) Int. Cl.
*G06F 9/455* (2006.01)
(52) U.S. Cl.
CPC .................................. *G06F 9/45533* (2013.01)
(58) Field of Classification Search
None
See application file for complete search history.

(56) References Cited

U.S. PATENT DOCUMENTS 8,839,245 B1 * 9/2014 Khajuria et al. .................. 718/1
2006/0070067 A1 * 3/2006 Lowery ......................... 718/100

* cited by examiner

*Primary Examiner* — Camquy Truong
(74) *Attorney, Agent, or Firm* — David R. Stevens; Stevens Law Group

(57) ABSTRACT

Example processing systems and methods are described. In one implementation, a method receives a request to perform a processing operation. The method identifies a first task associated with the processing operation and identifies a second task associated with the processing operation. A first virtual machine is invoked to perform the first task and a second virtual machine is invoked to perform the second task. The first and second virtual machines each execute an instance of a browser application to perform the first and second tasks, respectively.

12 Claims, 7 Drawing Sheets

PROCESSING SYSTEMS AND METHODS

TECHNICAL FIELD

The present disclosure relates to processing systems and methods that execute a processing operation by performing multiple tasks associated with the processing operation.

BACKGROUND

Various types of processing systems perform multiple tasks associated with a particular processing operation. As processing operations become more complex, more tasks are needed to complete the operations. Existing systems use application programs to perform specific processing operations. As a processing operation becomes more complex, the application program that performs the processing operation also becomes more complex. Each modification of the processing operation (e.g., the addition of more tasks) further increases the complexity of the application program. The management and modification of these complex application programs can be difficult and time consuming.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
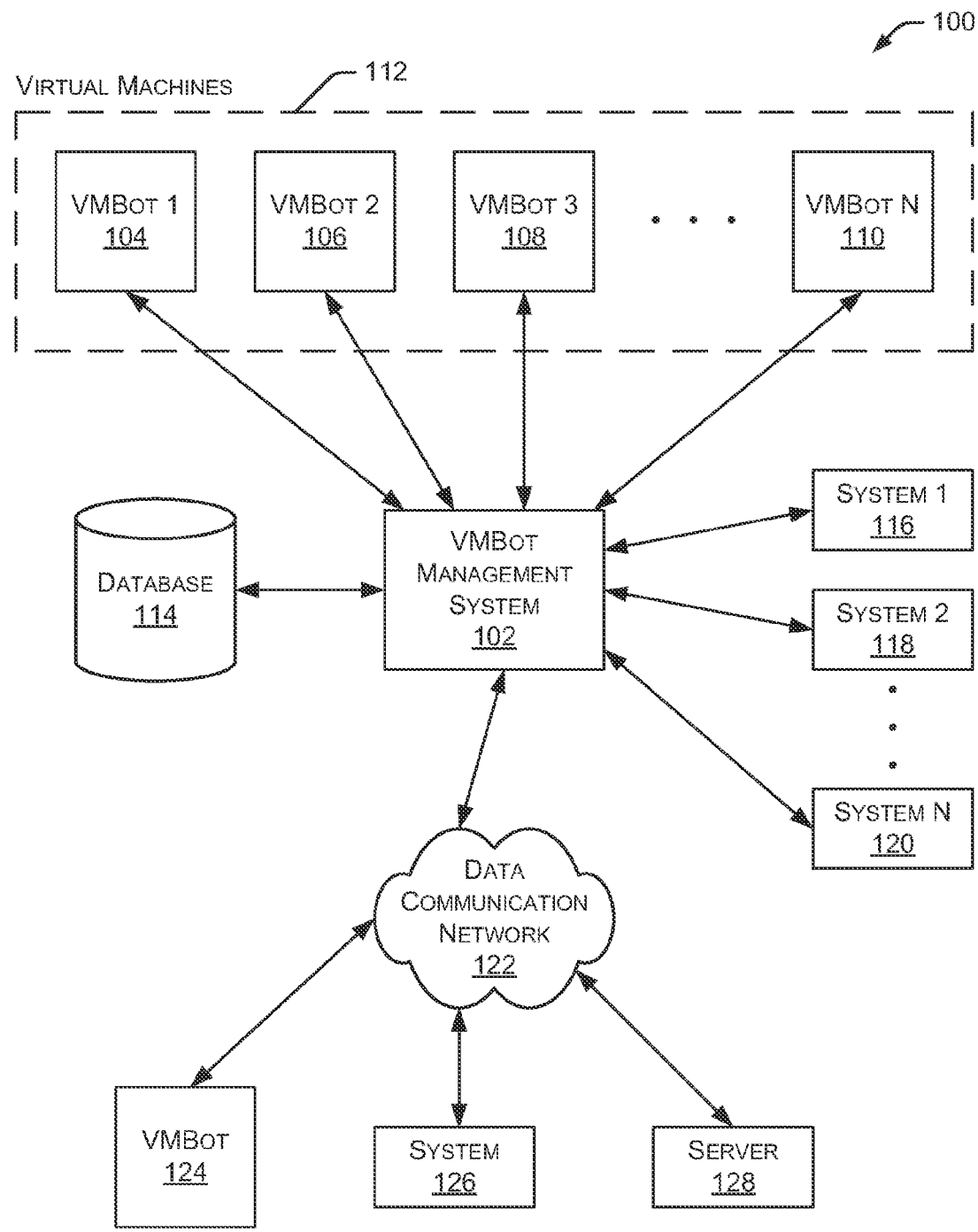
FIG. 1 is a block diagram depicting an environment within which an example embodiment may be implemented.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein perform a processing operation by performing multiple tasks associated with the processing operation. These multiple tasks are performed by virtual machines configured with specific software to form what is referred to herein as a "VMBot" (a virtual machine bot). A virtual machine (VM) refers to a computing system (or computing environment) that is created inside another computing system using software. Although the VM is contained inside another computing system as a software program, the VM operates like an independent computing system as far as the user or the outside world is concerned. The systems and methods described herein use these VMs as a container for software programs and applications, as discussed below. Together these software components and the VM form a "VMBot." Many of these VMBots may be used together to solve a specific processing problem as discussed in the examples herein. In particular implementations, the number of VMBots used to perform a specific processing operation range from a few VMBots to billions of VMBots.

Throughout this written description, the terms "virtual machine", "VM," and "VMBot" may be used interchangeably. When referring to a "VM," this written description is emphasizing the VM container, but assumes that there is a some VMBot definition contained inside the VM thereby making the VM referred to an actual VMBot. However, for simplicity, this machine may still be referred to simply as a VM. In some embodiments, each VM or VMBot is capable of performing a specific task. To implement a particular processing operation, any number of VMs or VMBots are implemented to perform all of the tasks necessary to complete the processing operation. Although specific examples herein refer to VMBots or VMs, alternate embodiments may use any type of mechanism or system to perform the multiple tasks associated with a processing operation.

The systems and methods described herein provide a flexible approach to performing one or more processing operations. In a particular embodiment, a request is received to perform a processing operation. The described systems and methods identify a first task and a second task associated with the processing operation. A first VM is invoked to perform the first task and a second VM is invoked to perform the second task. In a particular implementation, the first VM executes an instance of a browser application to perform the first task, and a second VM executes another instance of the browser application to perform the second task. In some embodiments, the results of these two tasks may then be sent to another VM for further processing or display to the user. This process may be extended from the two tasks mentioned in the example above to a situation (such as modeling of a biological organism) where millions or billions of VMBots are used together to simulate very complex processes that are difficult or impossible to model with existing techniques or systems.

In particular embodiments, the VMBot has several advantages in large scale computing operations. For example, the independence of the VMBots allows operations to proceed without interfering with each other. This makes bugs in the software easier to find and less damaging to the overall system operation, and allows for more complex pieces of VMBots to be created and used. Additionally, VMBots have a higher computing reliability due to the existing systems that allow VM-based systems to operate in fail-over or High Availability environments as well as the fact that VMBot independence also increases reliability of the systems. Further, VMBots are easy to clone, wake up, put to sleep, and control with existing software available in the market today. This allows fast assembly of a processing set of VMBots by simply choosing the required VMBot types from a pool of definitions and cloning each type of VMBot the number of times needed to accomplish the processing or data gathering task.

VMBots are also advantageous since data management, data storage, and data sharing methods already exist for VMs and thus also for VMBots. Further communication between VMBots and between a VMBot and management applications can be performed using standard protocols such as HTTP, HTTPS, FTP, and the like. A VMBot is an efficient way to scale a computing system large enough to attack problems such as organism modeling, human immune system modeling, global scale data gathering, genome to drug matching operations, and many other large scale biological tasks. Additionally, the cost of implementing systems using VMBots is very low. Utilizing modern computing servers, hundreds of VMBots may be put on a single low-cost server. Using multiplexing methods as described herein, the number of VMBots can be increased to thousands per low cost server. The VMBot platform may be thought of as a new computing and data communication platform where, like computers on the Internet or cells in the human body, VMBots can communicate with each other anywhere, but also cooperate, exchange information and coordinate work since they are also controlled and assigned tasks from a central planning/management application. So, a computing platform made of VMBots can have millions or billions of operations occurring over the entire globe, while being coordinated centrally or in a distributed peer to peer fashion. In this implementation, each node is able to communicate and exchange data with every other node using standard low-cost protocols, where VMBot types can be created by many different developers globally, VMBot types can be changed in real time, all for the purpose of solving problems that are data and compute intensive, and that were previously intractable. All of this is run from a single software program. Finally, a VMBot can be embedded in a physical robot, such as a robot designed for industrial or service applications, thereby allowing the physical robot to cooperate and interact with the "virtual" VMBots operated on the Internet or other data communication platform.

FIG. 1 is a block diagram depicting an environment 100 within which an example embodiment may be implemented. Environment 100 includes a VMBot management system 102 coupled to multiple VMBots 104, 106, 108, and 110. Collectively, VMBots 104-110 may be referred to as VMs 112. VMs 112 may also be referred to as a "pool of VMs," a "pool of VMBots" or a "resource pool." A particular pool of VMs (or VMBots) may contain any number of VMs (or VMBots). Each VMBot 104-110 performs a particular task or function, such as a task within a larger, more complex, processing operation. In some embodiments, the specific task performed by each VMBot 104-110 is limited to prevent the VMBot from interfering with other tasks within a processing operation, or interfering with other processing operations.

VMBot management system 102 manages the execution of multiple VMBots 104-110 to perform a processing operation. A database 114 is coupled to VMBot management system 102 and stores various information used by the VMBot management system, such as VMBot information, process operation data, and the like. Multiple systems 116, 118, and 120 are coupled to VMBot management system 102. These systems may communicate, for example, requests to perform processing operations to VMBot management system 102, which then invokes multiple VMBots 104-110 to perform the requested processing operation. Upon completion of the processing operation, VMBot management system 102 communicates the results of the processing operation to the requesting system 116, 118 or 120.

VMBot management system 102 is coupled to a data communication network 122, such as the Internet. Data communication network 122 may utilize any communication protocol and any type of communication medium. In some embodiments, data communication network 122 is a combination of two or more networks coupled to one another. VMBot management system 102 communicates with other VMBots 124, systems 126, and servers 128 through data communication network 122. Thus, VMBot management system 102 can distribute tasks to any VMBot 124 accessible via data communication network 122. Additionally, VMBot management system 102 can receive requests from any system 126 or server 128 coupled to data communication network 122.

In some embodiments the VMBot management system 102 can be distributed between the VMBots 104-110 and the tasks shared resulting in a peer-to-peer connection of the VMBots. This kind of system has the advantage of no central VMBot Management System, making the system less susceptible to certain security risks. However, this may increase the complexity of the VMBots themselves and may require more communication between VMBots.

Figure 2:
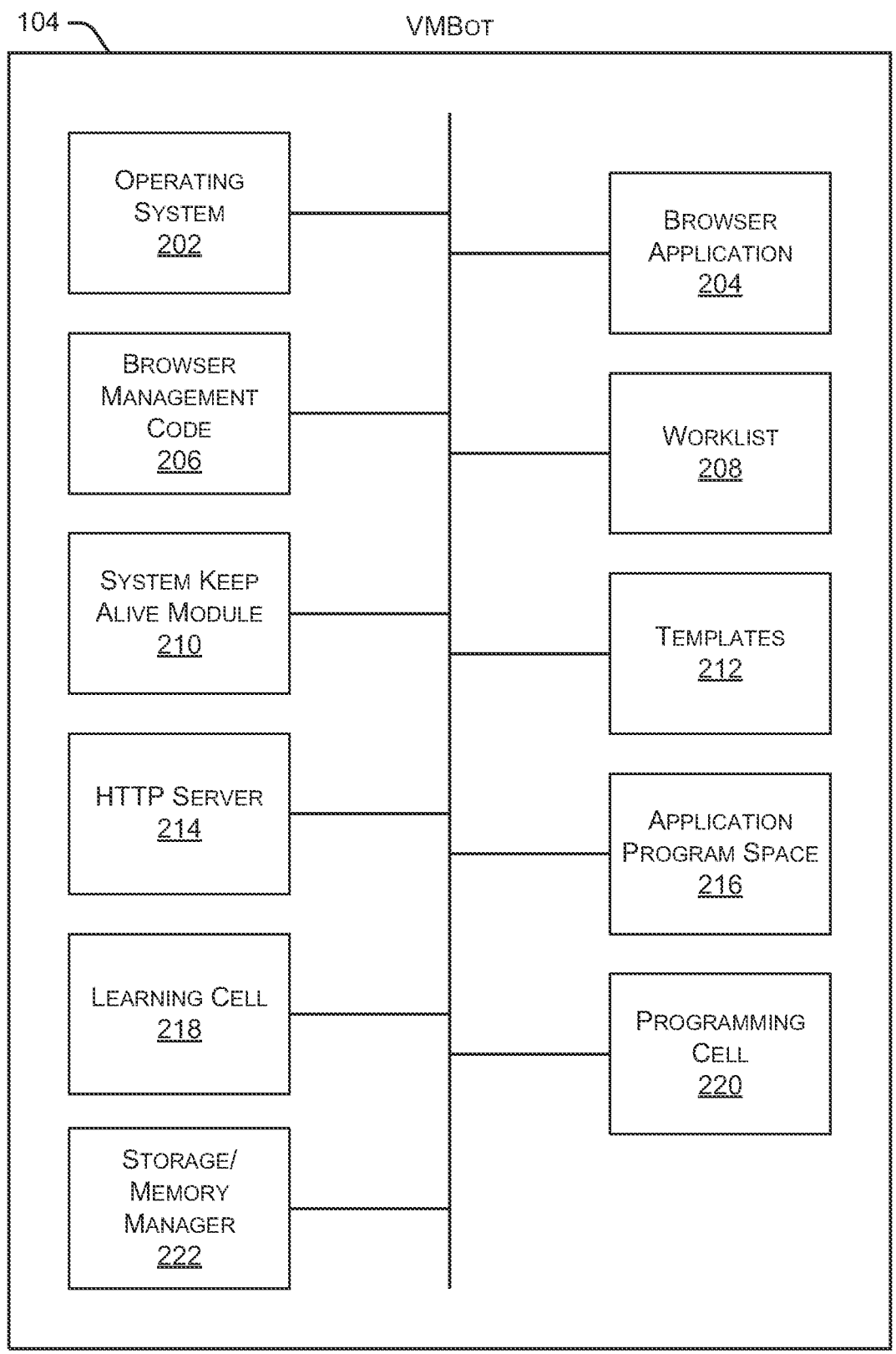
FIG. 2 is a block diagram depicting an embodiment of a VMBot (virtual machine bot) or virtual machine (VM).

FIG. 2 is a block diagram depicting an embodiment of VMBot 104. As shown in FIG. 2, VMBot 104 includes an operating system 202 that manages the operation of the VMBot, a browser application 204, and browser management code 206. Browser application 204 may be executed by VMBot 104 at the direction of VMBot management system 102. Browser management code 206 manages the execution of browser application 204 by VMBot 104. Additionally, browser management code 206 is responsible for executing operations that need the browser to get information from the Internet, other data communication networks or from other VMBots. For example, this part of the system retrieves content and data from websites, puts data or selections into forms on databases or websites, manages sessions with websites and the VMBot, passes data from the browser application and the other sections of the VMBot, communicates data to an external storage system, performs instruction reading and parsing, and reads communication information from other VMBot webpages for the purpose of VMBot-to-VMBot communication. Further, this management section can manage any browser plug-in application which might be used for encryption or decryption of data gathered from websites and passed to other sections of the VMBot or to other destinations. Browser management code 206 is also capable of managing certain security aspects of the system such as allowed URLs or other browser restrictions programmed by the VMBot management system for the purpose of security enhancement.

A worklist 208 is a set of tasks that need to be performed for a particular process. VMBot 104 may be responsible for a particular task within worklist 208. Example worklist tasks include: go to current URL in list, get URL list, execute product template, connect to server, write data to database xyz, set results flag, and go to next URL.

VMBot 104 also includes a system keep alive module 210, which indicates whether VMBot 104 is "alive" (e.g., available to perform a task). If a failure is detected in the system, system keep alive module 210 indicates that VMBot 104 is not currently available to perform tasks. In this situation, VMBot management system 102 will select a different VMBot to perform a needed task. Additionally, VMBot management system 102 may initiate a reset operation for the failed VMBot. Templates 212 define how VMBot 104 interacts with web site(s), other VMBots, other systems, and the like. A HTTP server 214 allows VMBot 104 to post results or communication information for other VMBots, management system or even the end user. This information may be passed from another source or be processing results or data collected or calculated by VMBot 104. Application program space 216 refers to the space for an off-the-shelf software program capable of running on a PC VM or in the case of Mac operating system being used on a Mac VM. Since VMs look like actual computing systems, they can run a large number of existing software programs directly with no special interface or coding work. Depending on the particular task defined for the VMBot, off-the-shelf software may be added to the definition of the VMBot to help it perform its task efficiently. Examples of off the shelf software include Microsoft Excel™, FTP software, email software or many other pre-existing software packages.

Additionally, VMBot 104 includes a learning cell 218, which includes, for example, a set of tables that define a set of tasks for VMBot 104 based on a set of conditions and "learned" behavior obtained from a training sequence or based on environmental feedback. A programming cell 220 is related to learning cell 218 and contains fixed programming behaviors based on the environment in which VMBot 104 is located. Programming cell 220 includes a set of relationships maintained in tables that specify the behavior of the VMBot based on the current inputs (e.g., the current request or processing operation). The tables within programming cell 220 may be changed by a training or learning process. A storage/memory manager 222 manages the storage and retrieval of data from a storage device, memory device, and the like.

Figure 3:
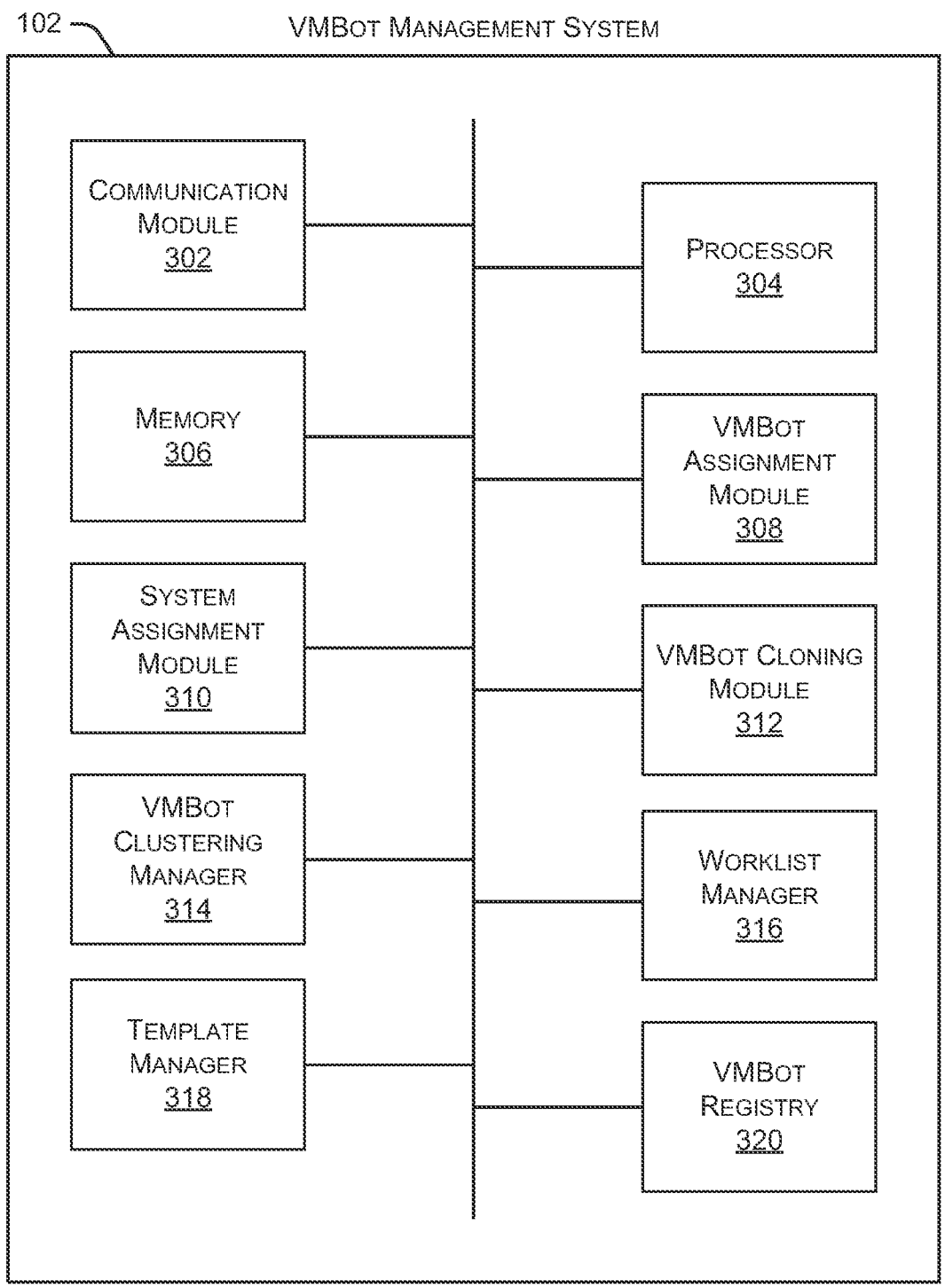
FIG. 3 is a block diagram depicting an embodiment of a VMBot management system.

FIG. 3 is a block diagram depicting an embodiment of VMBot management system 102. As shown in FIG. 3, VMBot management system 102 includes a communication module 302, a processor 304, and a memory 306. Communication module 302 allows VMBot management system 102 to communicate with other systems, such as VMBots 104-110, database 114, systems 116-120, VMBot 124, system 126, server 128, and the like. Processor 304 executes various instructions to implement the functionality provided by VMBot management system 102. Memory 306 stores these instructions as well as other data used by processor 304 and other modules contained in VMBot management system 102.

Additionally, VMBot management system 102 includes a VMBot assignment module 308, which assigns tasks to appropriate VMBots to be implemented by the assigned VMBot. A system assignment module 310 manages the assignment or association of processing operations with one or more systems (e.g., systems 116-120 and 126). For example, system assignment module 310 may assign a particular VMBot to perform processing operations for a specific system. A VMBot cloning module 312 creates a new instance of a VMBot by cloning an existing VMBot. VMBot cloning module 312 is capable of quickly creating a complete copy of an existing VMBot and deploying the newly created VMBot to perform a specific task.

A VMBot clustering manager 314 in VMBot management system 102 handles the clustering of multiple VMBots. Clustering of multiple VMBots allows a specific number of VMBots who share the cluster to communicate with decreased latency and larger transfer rates. For example, a set of VMBots are clustered if they need to share data or communicate together more efficiently than is normally the case for communication between VMBots. In some cases, the processing requirements require VMBots to share data efficiently, while in other cases VMBots need to be geographically distributed and thus are not clustered.

A worklist manager 316 manages worklists associated with one or more processing operations. As mentioned herein, a worklist is a set of tasks that need to be performed for a particular process. In some embodiments, multiple VMBots are each responsible for a particular task within the worklist. Worklist manager 316 manages the assignment of these tasks to VMBots, and manages the performance of the task by the assigned VMBot. A template manager 318 handles the use of various templates to perform certain processing operations. As discussed herein, a template defines how one or more VMBots interacts with other VMBots, other systems, and the like. A VMBot registry 320 maintains information about multiple VMBots, such as the task that a particular VMBot can perform, a process to which the VMBot is currently assigned, VMBots currently available for assignment, and the like.

Figure 4:
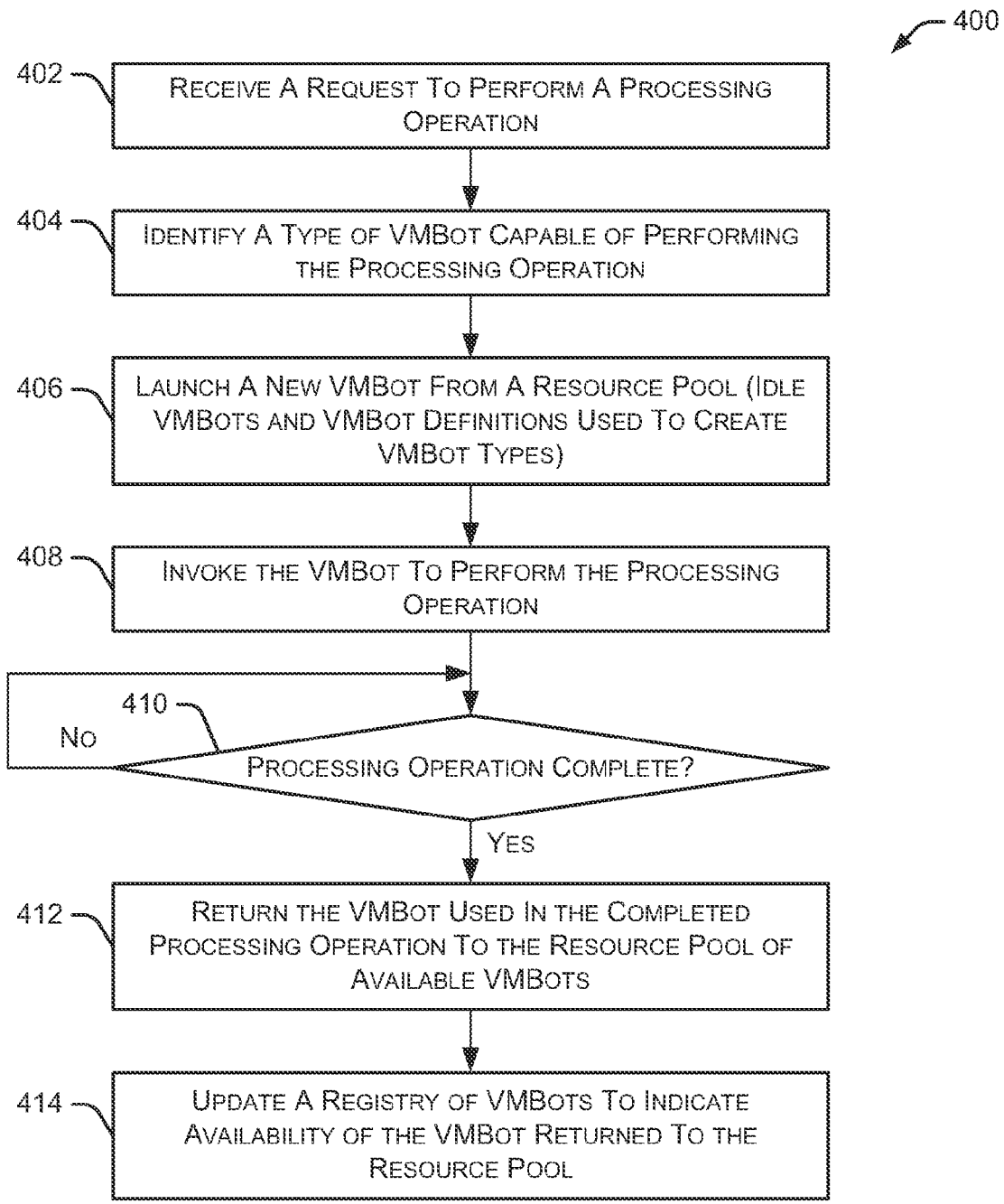
FIG. 4 is a flow diagram depicting an embodiment of a method for managing individual VMBots.

FIG. 4 is a flow diagram depicting an embodiment of a method 400 for managing individual VMBots. Method 400 is implemented, for example, within environment 100 shown in FIG. 1. Initially, method 400 receives a request to perform a processing operation at 402 and identifies a type of VMBot capable of performing the processing operation at 404. In some embodiments, method 400 identifies multiple VMBots capable of performing all or a portion of the processing operation. A new VMBot is launched from a resource pool at 406. The resource pool may include idle VMBots and VMBot definitions used to create VMBot types.

An example of a VMBot is one used to simulate a set of cells in a biological organism. In this case there are a large number of VMBots used to simulate the organism. Each VMBot contains a browser, a web server, management blocks, local storage, local memory, and a unique programming cell for each VMBot type that contains the behaviors of that cell type in the case of specific defined inputs. For each input and current state of the "cell", the cell will provide a different set of outputs. For example, a specific cell may emulate cell respiration taking glucose from a particular external store (another VMBot cell type for example) and "convert" that simulated glucose into simulated ATP so that the cell can be seen to be alive and energized. This is just part of an overall simulation but represents an example of how actual cell operation can be modeled is such a system to a large scale to find useful interactions between cells and drugs for example. In another embodiment, protein shapes that are modeled in specific VMBot types would "interact" with the molecular structure of a synthetic drug, with each VMBot responsible for comparing or "reacting" the drug molecule with its predetermined protein structure. Each VMBot may also be thought of as a 'programming thread' in a computer. For example, a specific VMBot type might monitor web sites for price changes. Once the VMBot is launched, it can run independently and only report back when it finds relevant data, essentially running as a separate process thread in an application that tracks product, pricing, and availability data on the web. In particular embodiments, the resource pool includes memory, storage, and processing components used to create VMBots and VMs. The VMBot definitions are used to create VMBots from the VMs that are created. The resource pool may also include idle VMBots that are not currently being used.

After launching a new VMBot from the resource pool, method 400 continues by invoking the VMBot to perform the processing operation at 408. Alternatively, the VMBot may be invoked to perform one or more tasks that form a part of the overall processing operation. Method 400 monitors the VMBot and/or processing operation to determine when the processing operation is complete at 410. When the processing operation is complete, the VMBot used in the completed processing operation is returned to the resource pool of available VMBots at 412. Method 400 then updates a registry of VMBots to indicate the availability of the VMBot that was just returned to the resource pool at 414.

Figure 5:
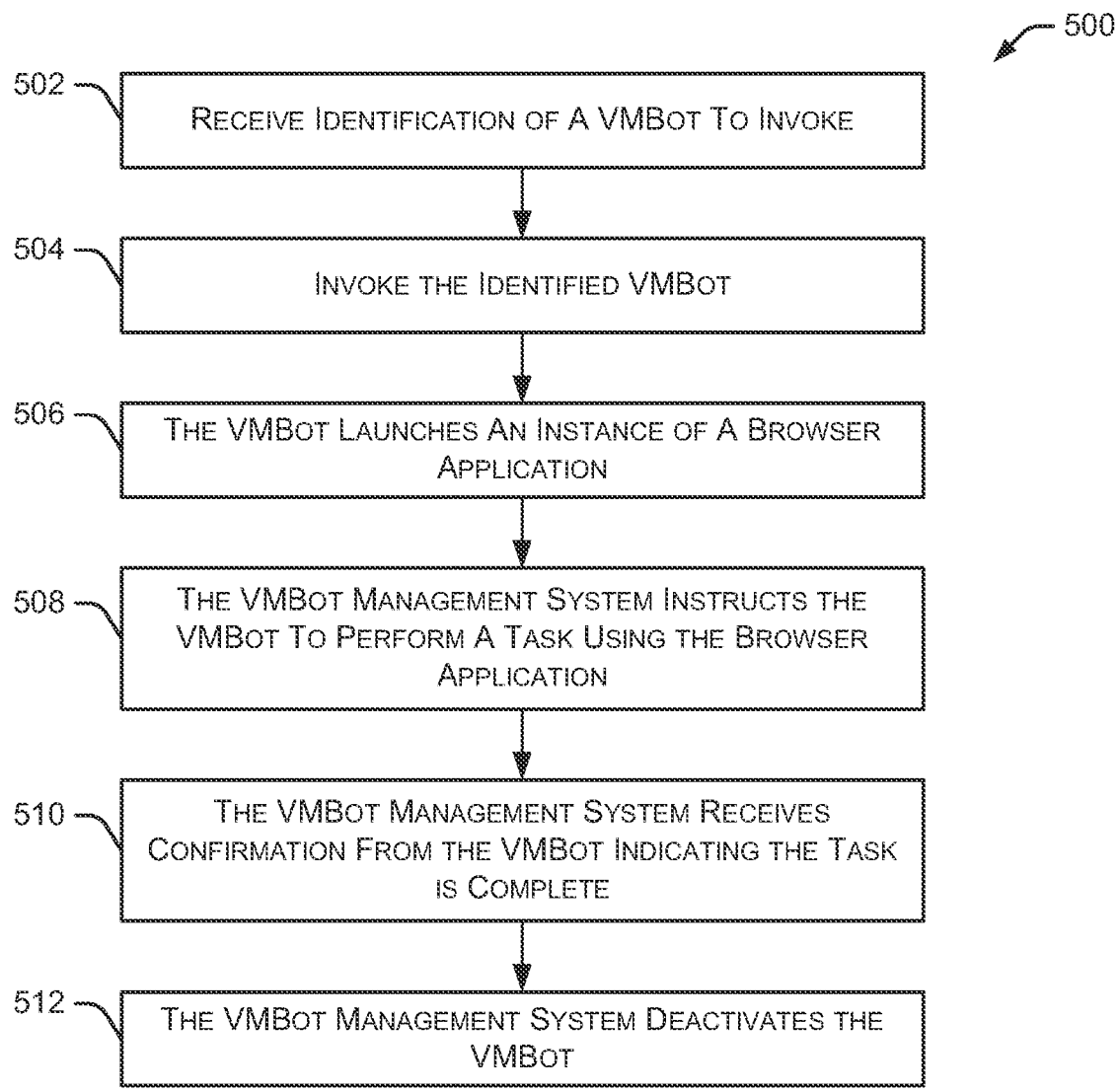
FIG. 5 is a flow diagram depicting an embodiment of a method for executing a browser application using a VMBot.

FIG. 5 is a flow diagram depicting an embodiment of a method 500 for executing a browser application using a VMBot. Method 500 is implemented, for example, within environment 100 shown in FIG. 1. Initially, method 500 receives identification of a particular VMBot to invoke at 502, and invokes the identified VMBot at 504. The VMBot launches an instance of a browser application at 506. The VMBot management system instructs the VMBot to perform one or more tasks using the browser application at 508. Additionally, the VMBot management system receives confirmation from the VMBot indicating the one or more tasks are complete at 510. The VMBot management system then deactivates the VMBot at 512 (e.g., returns the VMBot to the resource pool and updates the VMBot registry accordingly).

In a particular implementation, a VMBot can execute an instance of a browser application, such as Firefox™, Safari™, Internet Explorer™ or Google Chrome™. Multiple VMBots can be invoked at substantially the same time or may be invoked sequentially (e.g., a second is invoked after the first VMBot has completed its task). By executing each instance of the browser application as a separate VMBot, the multiple browser instances do not interfere with one another. Additionally, each instance of the browser application can be limited to accessing a particular web site or performing a specific task. This approach improves security since a particular instance of the browser application will not be exposed to data from multiple systems or multiple processing operations. Additionally, this approach limits the ability of malicious algorithms to infect a processing operation by attempting to force the VMBot to perform an unapproved task.

The multiple instances of the browser application allow each instance to operate (e.g., navigate web sites) independently of the other instances. Thus, if one instance experiences problems accessing a web site or accessing particular web site content, it does not affect the other instances of the browser application, which continue normal operation.

Figure 6:
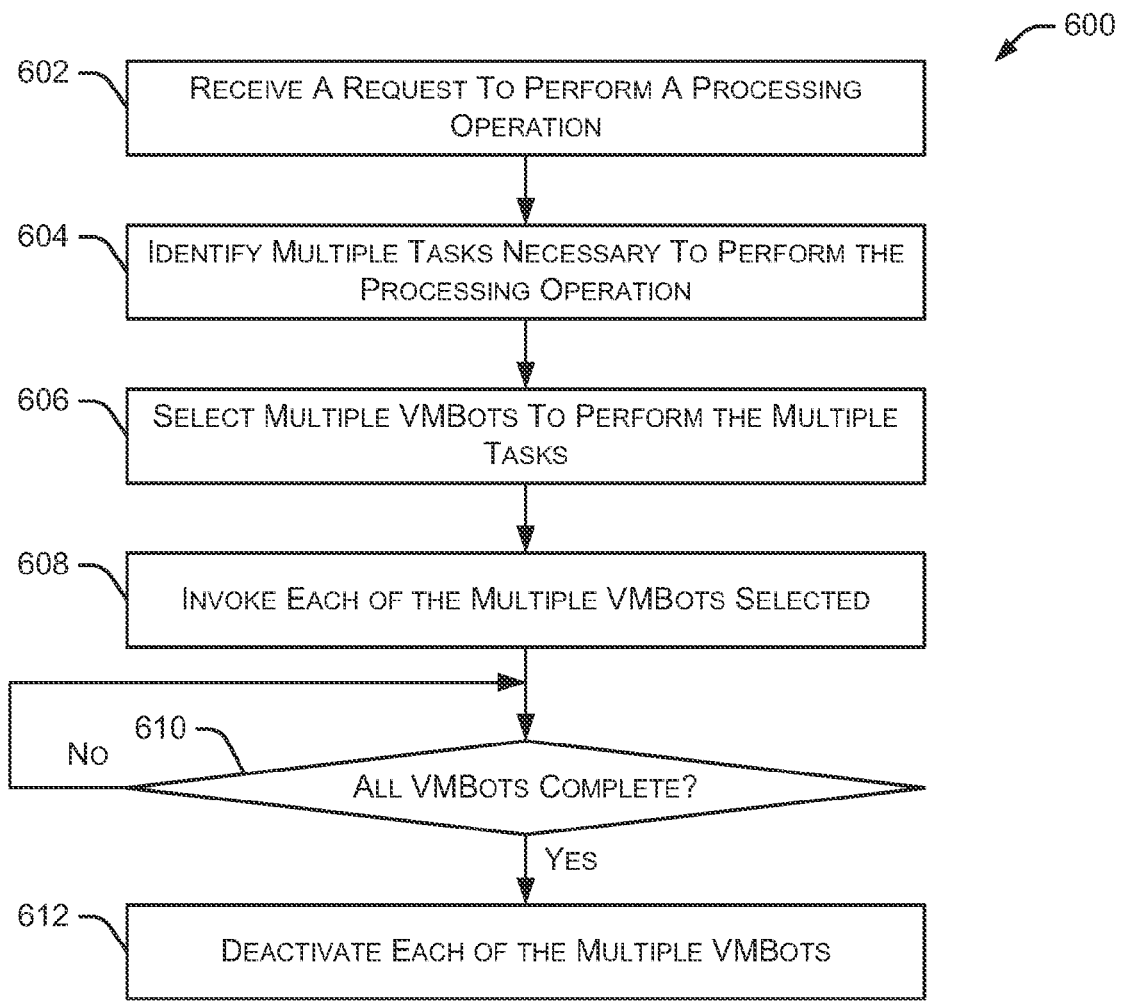
FIG. 6 is a flow diagram depicting an embodiment of a method for managing multiple VMBots.

FIG. 6 is a flow diagram depicting an embodiment of a method 600 for managing multiple VMBots. Method 600 is implemented, for example, within environment 100 shown in FIG. 1. Initially, method 600 receives a request to perform a processing operation at 602, and identifies multiple tasks necessary to perform the processing operation at 604. Method 600 continues by selecting multiple VMBots to perform the multiple tasks at 606. Each of the multiple VMBots selected are invoked at 608. In some embodiments, the multiple VMBots are invoked at substantially the same time. In other embodiments, the multiple VMBots are invoked at different times, such as when a processing operation requires multiple tasks to be performed sequentially. Method 600 monitors the performance of the multiple VMBots at 610 until all VMBots have completed their assigned tasks. When all VMBots are finished, method 600 continues to 612, where each of the multiple VMBots are deactivated and returned to the resource pool. Additionally, the VMBot registry is updated to indicate the updated status of the multiple VMBots. In alternate embodiments, each VMBot may be deactivated and returned to the resource pool as the VMBot finishes its assigned task.

In a particular embodiment, many VMs are stored as snap shots on a storage device (such as a disk drive) and referred to as "VM snaps." In alternate embodiments, the VMs may be stored in system cache memory or other memory/storage mechanism. These alternate embodiments are also referred to as "VM snaps." The VM snaps do not use any system resources (other than disk and/or memory storage) until they are invoked by the system. Each of these VM snaps can have security enhancements (e.g., limited URL access and maintenance of data for specific systems) such that the VM snap is only used for a specific system and for specific tasks. Thus, the VM snaps are "personalized" to the specific system. This approach is advantageous because there are defined VMBots ready to load for many different uses. Additionally, VMBots with jobs that are long-lived but not always processing can efficiently sleep and release resources when they are not busy, yet still be able to wake up and continue the same process as when it went to sleep. In this situation, a large number of VM snaps are stored on the disk storage, but only a few are invoked at any particular time. Thus, the multiple VM snaps are "multiplexed" such that a specific VM data set is only invoked at a specific time and circumstance that it is needed. This results in an efficient usage of system resources since the VM snaps do not require any system resources until they are invoked. After the VM snaps are deactivated, the previously used system resources are released and made available for other processes.

In a particular implementation, a processing operation requires the gathering of significant data from multiple data sources. In this situation, many VMBots are invoked (e.g., thousands, tens of thousands, millions or billions of VMBots) to handle the data gathering tasks. Each VMBot may retrieve a few elements of data from a specific data source and communicates the retrieved data to a database or other system. Since many VMBots are invoked substantially simultaneously, the processing operation is completed significantly faster than a single application retrieving the data in a sequential manner. Further, since VMBots have the capability to get data from websites or online databases, they have access to data that ordinary software programs do not access.

In another implementation, multiple VMBots may simulate an organism. For example, each of the multiple VMBots models one cell of an organism. Depending on the complexity of the organism, tens or hundreds of thousands, millions or billions of VMBots may be invoked to simulate the organism. Thus, each VMBot has the specific task of modeling a specific cell of the organism.

Thus, the uses of the VMBot computing architecture applies to many computing and processing needs, such as modeling of biological organisms, large data gathering operations, secure payment and ecommerce transactions, and personal service applications where VMBots manage online tasks for users such as shopping, travel arrangements or stock tracking. The VMBot computing architecture is also applicable where VMBots need to be aware of their physical environment or specific location dependencies and applications where VMBots are embedded into physical robots and connected back into the Internet or other data communication system where they can work and cooperate with other VMBots in their system.

Figure 7:
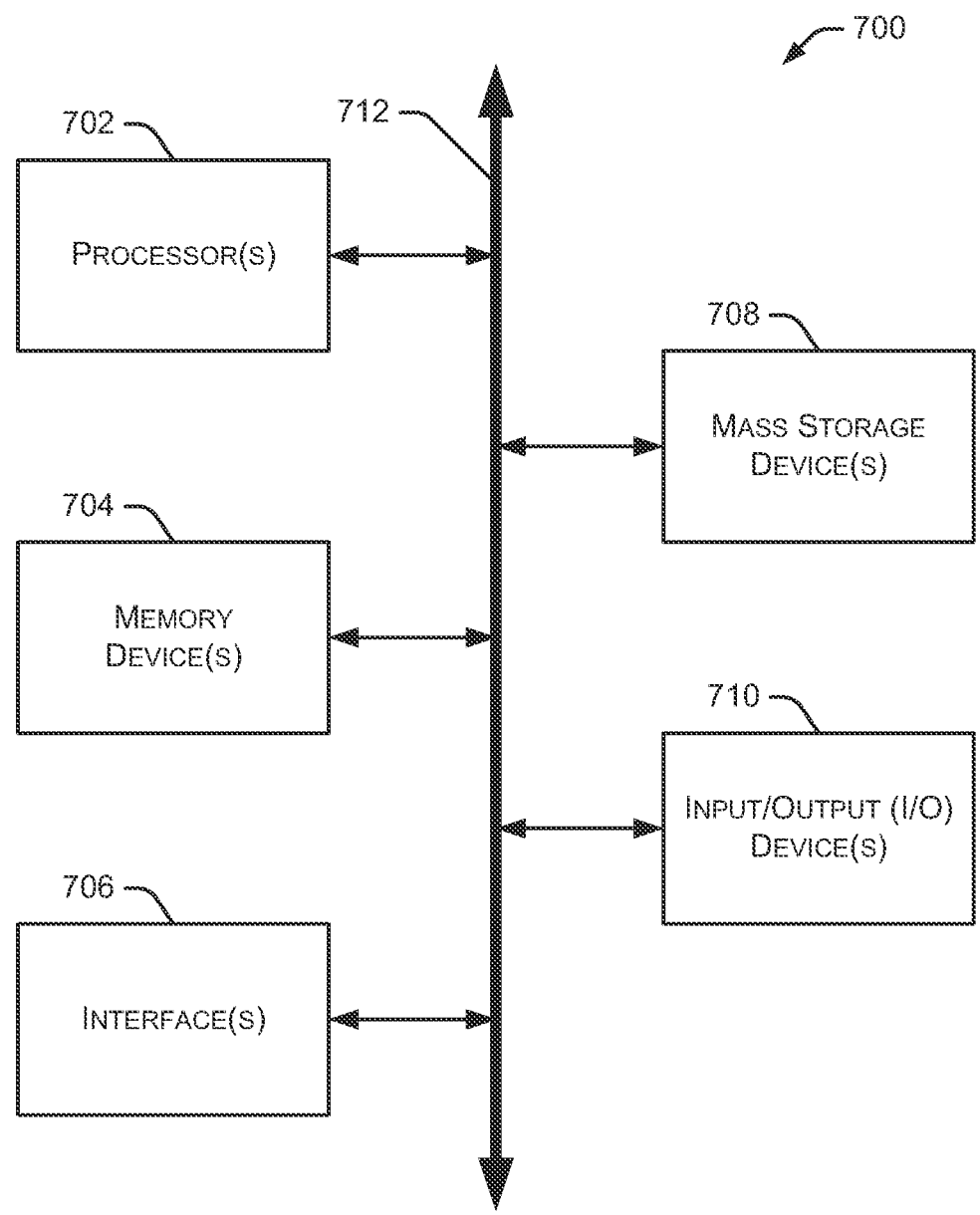
FIG. 7 is a block diagram depicting an example computing device.

FIG. 7 is a block diagram depicting an example computing device 700. Computing device 700 may interface, for example, with a VMBot as if it were another standard computing system. Further, standard computing devices, such as those depicted in FIG. 7, can be configured to hold one or more VMs for use as VMBots. Computing device 700 may be used to perform various procedures, such as those discussed herein. Computing device 700 can function as a server, a client or any other computing entity. Computing device 700 can be any of a wide variety of computing devices, such as a desktop computer, a notebook computer, a server computer, a handheld computer, a tablet, and the like.

Computing device 700 includes one or more processor(s) 702, one or more memory device(s) 704, one or more interface(s) 706, one or more mass storage device(s) 708, and one or more Input/Output (I/O) device(s) 710, all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 include various computer-readable media, such as volatile memory (e.g., random access memory (RAM)) and/or nonvolatile memory (e.g., read-only memory (ROM)). Memory device(s) 704 may also include rewritable ROM, such as Flash memory.

Mass storage device(s) 708 include various computer readable media, such as magnetic tapes, magnetic disks, optical disks, solid state memory (e.g., Flash memory), and so forth. Various drives may also be included in mass storage device(s) 708 to enable reading from and/or writing to the various computer readable media. Mass storage device(s) 708 include removable media and/or non-removable media.

I/O device(s) 710 include various devices that allow data and/or other information to be input to or retrieved from computing device 700. Example I/O device(s) 710 include cursor control devices, keyboards, keypads, microphones, monitors or other display devices, speakers, printers, network interface cards, modems, lenses, CCDs or other image capture devices, and the like.

Interface(s) 706 include various interfaces that allow computing device 700 to interact with other systems, devices, or computing environments. Example interface(s) 706 include any number of different network interfaces, such as interfaces to local area networks (LANs), wide area networks (WANs), wireless networks, and the Internet.

Bus 712 allows processor(s) 702, memory device(s) 704, interface(s) 706, mass storage device(s) 708, and I/O device(s) 710 to communicate with one another, as well as other devices or components coupled to bus 712. Bus 712 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 700, and are executed by processor(s) 702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:
    receiving a request to perform a processing operation;
    identifying a first task associated with the processing operation;

identifying a second task associated with the processing operation;

invoking, using one or more processors, a first virtual machine to perform the first task, wherein the first virtual machine executes an instance of a browser application to perform the first task, wherein the first virtual machine includes a first programming cell that includes tables that define a set of tasks associated with the first virtual machine, and wherein the first virtual machine is functionally limited to performing the set of tasks associated with the first virtual machine and invoking, using the one or more processors, a second virtual machine to perform the second task, wherein the second virtual machine executes another instance of the browser application to perform the second task, wherein the second virtual machine includes a second programming cell that includes tables that define a set of tasks associated with the second virtual machine, and wherein the second virtual machine is functionally limited to performing the set of tasks associated with the second virtual machine.

2. The method of claim 1, wherein the request to perform a processing operation is received from an external system.

3. The method of claim 1, further comprising generating a result associated with the invoking of the first virtual machine and the second virtual machine.

4. The method of claim 3, further comprising communicating the result to an external system that generated the request.

5. The method of claim 1, further comprising selecting an appropriate first virtual machine to perform the first task.

6. The method of claim 5, wherein selecting an appropriate first virtual machine includes accessing a registry that identifies available virtual machine functions.

7. The method of claim 1, further comprising cloning an existing virtual machine to create the first virtual machine.

8. The method of claim 1, further comprising selecting the first virtual machine from a pool of available virtual machines.

9. The method of claim 1, wherein the first virtual machine and the second virtual machine are invoked substantially simultaneously.

10. The method of claim 1, wherein the first virtual machine and the second virtual machine are invoked sequentially.

11. The method of claim 1, wherein the tables of the first programming cell can be changed by a training process, wherein the training process is performed based on environmental feedback.

12. A method comprising:

receiving a request to perform a processing operation;

identifying a first task associated with the processing operation;

selecting a first virtual machine to perform the first task;

identifying a second task associated with the processing operation;

selecting a second virtual machine to perform the second task;

invoking, using one or more processors, the first virtual machine to perform the first task, wherein the first virtual machine is functionally limited to performing the first task; and invoking, using the one or more processors, the second virtual machine to perform the second task, wherein the second virtual machine is functionally limited to performing the second task;

wherein the first virtual machine includes a programming cell that includes tables that define a set of tasks associated with the first virtual machine, and wherein the tables of the programming cell can be changed by a training process, wherein the training process is performed based on environmental feedback.

* * * * *